(12) United States Patent
Wood et al.

(10) Patent No.: US 10,607,242 B1
(45) Date of Patent: Mar. 31, 2020

(54) GENERATION OF SUBSCRIPTION RECOMMENDATIONS FOR CONTENT CREATORS

(71) Applicant: PATREON, INC., San Francisco, CA (US)

(72) Inventors: Timothy Wood, San Francisco, CA (US); Jon Winston, Mill Valley, CA (US)

(73) Assignee: Patreon, Inc., San Francisco, CA (US)

( * ) Notice: Subject to any disclaimer, the term of this patent is extended or adjusted under 35 U.S.C. 154(b) by 401 days.

(21) Appl. No.: 15/432,828

(22) Filed: Feb. 14, 2017

(51) Int. Cl.
*G06Q 30/02* (2012.01)

(52) U.S. Cl.
CPC ..... *G06Q 30/0201* (2013.01); *G06Q 30/0202* (2013.01)

(58) Field of Classification Search
USPC .............................................. 705/7.11–7.42
See application file for complete search history.

(56) References Cited

U.S. PATENT DOCUMENTS

| | | | |
|---|---|---|---|
| 8,850,490 B1* | 9/2014 | Thomas | H04N 21/47211 |
| | | | 725/109 |
| 9,060,249 B2* | 6/2015 | Meredith | H04W 4/022 |
| 9,734,521 B2* | 8/2017 | Curtis | G06Q 30/04 |
| 2008/0215467 A1* | 9/2008 | Huffman | G06Q 10/10 |
| | | | 705/30 |
| 2013/0197979 A1* | 8/2013 | Han | G06F 16/958 |
| | | | 705/14.1 |

OTHER PUBLICATIONS

Ondrejka, Cory, "Escaping the gilded cage: User created content and building the metaverse", 49 N.Y.L. Sch. L. Rev. 81 (2004). (Year: 2004).*

* cited by examiner

*Primary Examiner* — Amber A Misiaszek
(74) *Attorney, Agent, or Firm* — Esplin & Associates, PC

(57) ABSTRACT

A system and method is provided for generating subscription recommendations suggesting ways that one or more creators of content may increase subscribership and/or prominence of the one or more creators. Subscription recommendations can involve changing and/or updating subscription levels offered by a content creator to potential, existing, or previous subscribers of the content creator. Current and/or historical performance data associated with the content creator, other content creators, and/or the consumers making up a community of subscribers may be analyzed in order to generate subscription recommendations.

20 Claims, 6 Drawing Sheets

GENERATION OF SUBSCRIPTION RECOMMENDATIONS FOR CONTENT CREATORS

FIELD

The disclosure relates to membership platforms, and in particular, to subscription-based funding in exchange for content creator consideration. Subscription recommendations, e.g., recommendations for creating, updating, and/or providing levels of funding to which users can subscribe, may be provided to a content creator to allow the content creator to fine-tune subscription offerings.

BACKGROUND

Different platforms can be utilized by entities seeking contributions from the general public to obtain a needed service(s) and/or resource(s). Some of these platforms facilitate raising resources (i.e., funds) from the general public through monetary contributions or donations to support a project. Oftentimes, supporters of a project are given rewards or special perks, where the size and/or exclusivity of the rewards or special perks can depend on the amount contributed.

SUMMARY

The disclosure describes systems and methods for generating subscription recommendations suggesting ways that one or more creators of content may increase subscribership and/or prominence of the one or more creators. Subscription recommendations can involve changing and/or updating subscription levels offered by a content creator to potential, existing, or previous subscribers of the content creator. Current and/or historical performance data associated with the content creator, other content creators, and/or the consumers making up a community of subscribers may be analyzed in order to generate subscription recommendations.

One aspect of the disclosure relates to a system configured to analyze a subscription-based enterprise driven by a content creator creating recurring content and generate subscription recommendations for the content creator. The system may comprise one or more physical processors configured by machine-readable instructions to obtain performance data associated with the content creator. Such performance data may include creation data and community data. Creation data may characterize at least one of content made available by the content creator, the content creator, and/or content creator activity to which one or more of consumers of content generated by the content creator are granted preferential access. Community data may characterize one or more attributes of the consumers.

The system may obtain a set of subscription levels for the content creator. Different subscription levels of the set of subscription levels can correspond to different rates of consideration payment payable by the consumers. The system may generate the subscription recommendations based on the performance data and the set of subscription levels, where the subscription recommendations can indicate specific creator consideration in exchange for the different subscription levels.

Creator consideration may comprise at least one of an amount of content created by the content creator and/or an amount of content creator activity commensurate with the different rates of consideration payment. The creator consideration may comprise at least one of a frequency at which content is created by the content creator and/or a frequency of content creator activity commensurate with the different rates of consideration payment. The creator consideration may comprise at least one of a type of content created by the content creator and/or a type of content creator activity commensurate with the different rates of consideration payment.

The system may be configured by machine-readable instructions to obtain secondary performance data. The secondary performance data may characterize at least one of secondary creation data and secondary community data associated with at least a second content creator. The secondary creation data may characterize at least one of secondary content created by the secondary content creator, the secondary content creator, and/or secondary content creator activity to which one or more of consumers of the secondary content are granted preferential access. The secondary community data may characterize one or more attributes of the consumers of the secondary content; and generate the subscription recommendations based on the performance data, the secondary performance data, and the set of subscription levels.

The one or more physical processors may be further configured by machine-readable instructions to obtain a set of preferred subscription levels specified by the content creator. The one or more physical processors may be further configured by machine-readable instructions to customize the generated subscription recommendations based on the set of preferred subscription levels. The one or more physical processors may be further configured by machine-readable instructions to obtain at least one of content and/or content creator activity preferences specified by the content creator. The one or more physical processors may be further configured by machine-readable instructions to customize the generated subscription recommendations based on the at least one of content and/or content creator activity preferences.

The at least one of content and/or content creator activity preferences may comprise one or more of preferred amounts of content to be created and/or content creator activity to be engaged in, preferred frequencies at which content is to be created and/or content creator activity to be engaged in, and/or preferred types of content to be created and/or content creator activity to be engaged in specified by the content creator. The subscription recommendations may comprise a recommendation for adjusting a current subscription level of at least one consumer to a new subscription level based upon an observed trend in the performance data, wherein the observed trend in the performance data comprises at least one of a churn rate and a cycling trend associated with the consumers of the content.

One aspect of the disclosure relates to a method of generating subscription recommendations. The method may be implemented in a computer system comprising one or more physical processors and non-transitory electronic storage media storing machine-readable instructions. The method may comprise monitoring performance data associated with one or more content creators utilizing a recurring content creation site. The performance data may include creation data characterizing at least one of content created by the one or more content creators, the one or more content creators, and/or content creator activity undertaken by the one or more content creators to which preferential access is granted to one or more consumers of the content. The performance data may include community data characterizing one or more attributes of consumers of content generated by the one or more content creators. The method may comprise generating the subscription recommendations based on correlations between the monitored performance data and subscription levels corresponding to different rates of consideration payment payable by consumers in exchange for specific creator consideration from the one or more content creators for each of the subscription levels.

The specific creator consideration may comprise at least one of amounts of content created by the one or more content creators and/or amounts of content creator activity undertaken by the one or more content creators commensurate with the different rates of consideration payment. The specific creator consideration may comprise at least one of frequencies at which content is created by the one or more content creators and/or frequencies of content creator activity undertaken by the one or more content creators commensurate with the different rates of consideration payment. The specific creator consideration may comprise at least one of types of content created by the one or more content creators and/or types of content creator activity to be undertaken by the one or more content creators commensurate with the different rates of consideration payment.

The method may further comprise obtaining one or more of preferred subscription levels, preferred content to be created, and/or preferred content creator activity to be undertaken specified by the one or more content creators. The generation of subscription recommendations may be further based upon the one or more of the preferred subscription levels, the preferred content to be created, and/or the preferred content creator activity to be undertaken.

The subscription recommendations may comprise a recommendation for adjusting a current subscription level of at least one consumer to a new subscription level based upon an observed trend in the performance data, wherein the observed trend in the performance data may comprise at least one of a churn rate and a cycling trend associated with the consumers of the content.

The subscription recommendations may comprise a recommendation for engaging in a partnership with a third-party undertaking a promotional activity on behalf of the one or more content creators. The subscription recommendations may comprise a recommendation for increasing or discounting the different rates of consideration payment payable by the consumers.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
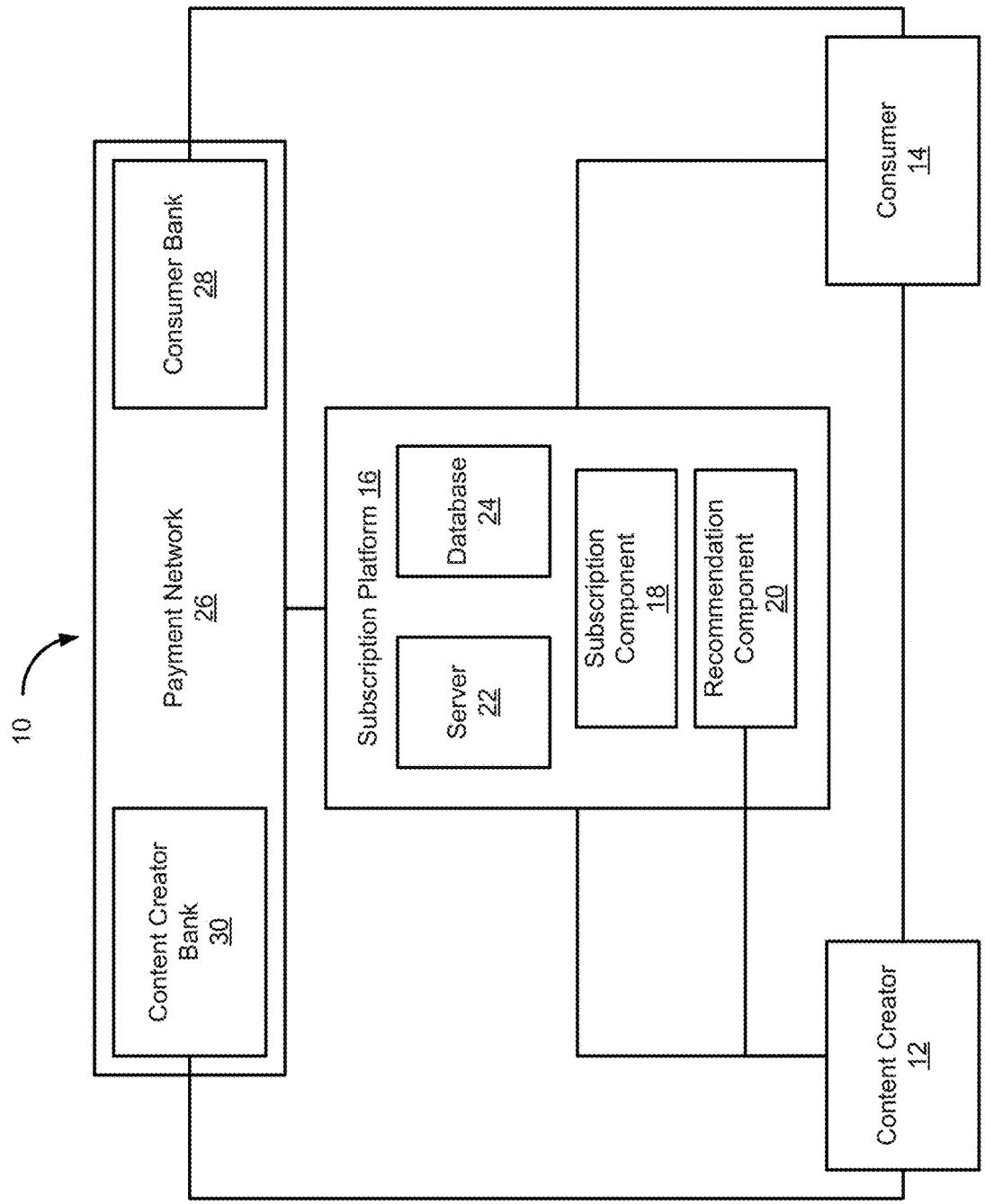
FIG. 1 illustrates an example membership system.

Some entities may seek to fund their business through subscriptions. Such entities may utilize online membership platforms that allow consumers to sign up for ongoing payments in exchange for rewards or other membership benefits.

Some entities seeking funding may be content creators, for example, artists, musicians, educators, etc. Content creators may create content, which can refer to any type of information, experience, or product provided to an audience or end-user, whether it be digital, analog, or virtual. For example, content may include but is not limited to video content, podcasts, photographic art, webcomics, do-it-yourself crafts, digital music, performance art, and other types of content. Content creators may utilize membership platforms that allow consumers to become subscribers of the content creator. As subscribers, consumers may contribute or donate money to a content creator on a recurring (e.g., weekly or monthly) basis or per piece of content created by the content creator. It should be noted that although the disclosure may describe embodiments in the context of a subscriber-based membership platform such as a recurring content website, subscription recommendations can be provided to content creators irrespective of how content may be distributed and/or any particular membership platform utilized by the content creator.

In order to maximize revenue received from subscribers, maximize the number of subscribers, and/or gain prominence, content creators can be provided with subscription recommendations. As described above, a subscription recommendation can be some form of a proposal, advice, or suggestion for creating, updating, and/or providing levels of funding to which users can subscribe that may allow the content creator to fine-tune subscription offerings. For example, subscription recommendations can suggest how much content a content creator might generate, how frequently the content creator might generate content, what type of content or special perks the content creator might offer to consumers, etc. in order to increase the number of his/her subscribers. For example, subscription recommendations can suggest how a content creator might entice a consumer contributing at a particular subscription level to increase his/her contributions by subscribing at a higher subscription level. Subscription recommendations may include suggestions that a content creator partner with a third party to provide promotional merchandise or engage in joint-promotional activity.

Generating subscription recommendations can be based on current performance data of the content creator, performance data relevant to the community of consumers that subscribe to the content creator, as well as historical performance data associated with the content creator and/or community of consumers. Subscription recommendations can be based on the preferences of the content creator, as well as performance data associated with other content creators creating similar content or different content. Subscription recommendations may provide suggestions for scaling back content generation and/or the offering of special perks when data indicates that a content creator can at least maintain subscribers with less offerings. Other types and/or forms of subscription recommendations are contemplated in the disclosure, some of which will be discussed in greater detail below.

FIG. 1 illustrates an example subscriber-based membership system 10. A content creator 12 may register and set up a creator account with subscription platform 16. Content creator 12 may create a page on a website hosted by server 22 of subscription platform 16 and input relevant information. Content creator 12 may input information associated with and/or relevant to content creator 12 via subscription component 18, such as creation data, content data, information specifying desired and/or initial subscription levels, and/or preferential access information which will be discussed in greater detail below. The page created by content creator 12 may be built using such information to make potential consumers aware of how content creator 12 may wish to be supported/receive support for his/her content creation.

Consumer 14 may set up a subscriber account with subscription platform 16. Through the page created by content creator 12, a consumer 14 may pledge to donate a given amount of money to content creator 12 every time content creator 12 creates content. For example, if content creator 12 is an artist, consumer 14 may pledge to donate ten dollars each time content creator 12 creates a piece of art.

In order to remit payment to content creator 12, consumer 14 may set up a payment mechanism through subscription platform 16. When subscription platform 16 is notified or determines that content creator 12 has created content, subscription platform 16 may access payment network 26 to obtain and transfer the pledged amount from consumer bank 28 to content creator bank 30. Alternatively (or in addition to per content pledge donations), consumer 14 may pledge to donate a given amount to content creator 12 on a recurring basis through subscription platform 16. For example, consumer 14 may pledge to donate five dollars each month to content creator 12, where each month, subscription platform 16 may access payment network 26 to obtain and transfer the pledged amount from consumer bank 28 to content creator bank 30. It should be understood that consumer 14 may have an established relationship with consumer bank 28, and that content creator 12 may have an established relationship with content creator bank 30. It should be noted that subscription platform 16 may retain a portion, such as some percentage, of the pledged amount, as a fee for hosting the page created by content creator 12, providing payment services, etc.

As consideration for the pledged donations, content creator 12 may provide some type of preferential access to consumer 14 in the form of, e.g., special perks or rewards. Content creator 12 can specify tiers of preferential access based upon the amount of money consumer 14 pledges to donate and/or depending on whether the pledged donation is a recurring donation or a per content donation. The amounts and/or types of pledged donations that can be made by consumer 14 to support content creator 12 can be referred to as subscription levels.

For example, in return for a monthly, recurring ten dollar donation, content creator 12 may provide a high-resolution digital image of the artwork created during that month to consumer 14. In exchange for a weekly, recurring ten dollar donation, content creator 12 may provide a high-resolution digital image of the artwork created during that month as well as a time-lapse video of content creator 12 creating the artwork. In exchange for a five dollar per content donation, content creator 12 may provide a low-resolution digital image of the artwork. For a one hundred dollar per content donation, content creator 12 may engage in a live webchat with consumer 14. Various types of preferential access can be provided by content creator 12 to consumer 14, and content creator 12 may specify the subscription level to preferential access correlation.

The preferential access may be provided to consumer 14 from content creator 12. For example, content creator 12 may email digital copies of artwork to consumer 14. The preferential access may be provided to consumer 14 from content creator 12 via subscriber platform 16. For example, the live webchat between content creator 12 and consumer 14 may be provided through some chat functionality of the page of content creator 12 hosted on server 22 of subscription platform 16.

It should be noted that not all subscription levels are necessarily associated with preferential access. Some consumers may be driven to subscribe to content creator 12 on the basis of created content rather than any special perks or rewards.

The specification and management of subscriptions on behalf of content creator 12 may be handled by subscription component 18 alone or in conjunction with database 24. For example, a user interface may be provided via subscription component 18 allowing content creator 12 to specify his/her desired subscription levels and corresponding preferential access. Subscription component 18 may receive the information input by content creator 12 regarding desired subscription levels and corresponding preferential access. Such information may be stored as a matrix or other data structure in database 24 or within memory local to subscription component 18.

Content creator 12 may add subscription levels, update and/or delete existing subscription levels, as well as add, update, and/or delete preferential access information and/or its correspondence to subscription levels. Such changes can be input via subscription component 18 and reflected in its local memory and/or database 24. Such changes can be based upon the subscription levels provided to content creator 12 via recommendation component 20. It should be understood that content creator 12 and/or consumer 14 may be an individual or some entity representative of an individual or group of individuals.

Figure 2:
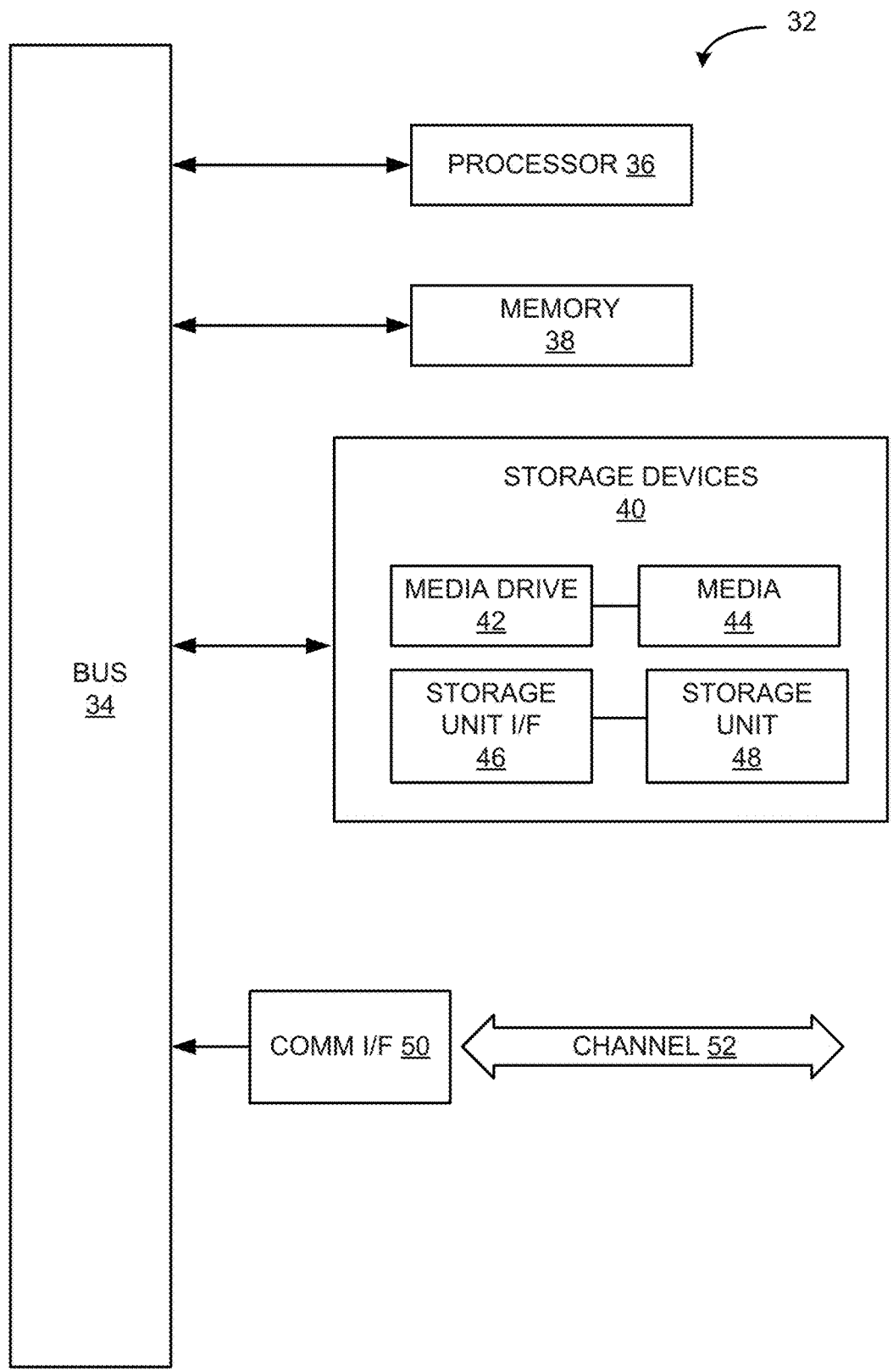
FIG. 2 is an example computing component that may be used to implement various features described in the disclosure.

FIG. 2 illustrates an example computing component that may be used to implement various features of the system and methods disclosed herein, for example, subscription platform 1, server 22, subscription component 18, payment network 26, recommendation component 20, and/or one or more elements comprising these components.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this disclosure, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components are implemented in whole or in part using software, in one embodiment, these software elements can be implemented to operate with a computing or processing component capable of carrying out the functionality described with respect thereto. One such example computing component is shown in FIG. 2. Various embodiments may be described in terms of this example computing component 32. After reading this disclosure, it will become apparent to a person skilled in the relevant art how to implement the application using other computing components or architectures.

Computing component 32 may represent, for example, computing or processing capabilities found within a desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 32 might also represent computing capabilities embedded within or otherwise available to a given device. For example, a computing component might be found in other electronic devices such as, for example, portable computing devices, and other electronic devices that might include some form of processing capability.

Computing component 32 might include, for example, one or more processors, controllers, control components, or other processing devices, such as a processor 36. Processor 36 might be implemented using a general-purpose or special-purpose processing engine such as, for example, a microprocessor, controller, or other control logic. In the illustrated example, processor 36 is connected to a bus 34, although any communication medium can be used to facilitate interaction with other components of computing component 32 or to communicate externally.

Computing component 32 might include one or more memory components, simply referred to herein as memory 38. For example, preferably random access memory (RAM) or other dynamic memory, might be used for storing information and instructions to be executed by processor 36. Memory 38 might be used for storing temporary variables or other intermediate information during execution of instructions, such as machine-readable instructions, to be executed by processor 36. Computing component 32 might include a read only memory ("ROM") or other static storage device coupled to bus 34 for storing static information and instructions for processor 36.

The computing component 32 might include one or more various forms of information storage mechanisms 40, which might include, for example, a media drive 42. The media drive 42 might include a drive or other mechanism to support fixed or removable storage media 44. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 44 might include, for example, a hard disk, an integrated circuit assembly, magnetic tape, cartridge, optical disk, a CD or DVD, or other fixed or removable medium that is read by, written to or accessed by media drive 42. As these examples illustrate, the storage media 44 can include a computer usable storage medium having stored therein computer software or data.

Computing component 32 might include other similar instrumentalities for allowing computer programs or other instructions or data to be loaded into computing component 32. Such instrumentalities might include, for example, a fixed or removable storage unit 48 and an interface 46. Examples of such storage units 48 and interfaces 46 can include a program cartridge and cartridge interface, a removable memory (for example, a flash memory or other removable memory component) and memory slot, a PCMCIA slot and card, and other fixed or removable storage units 48 and interfaces 46 that allow software and data to be transferred from the storage unit 48 to computing component 32.

Computing component 32 might include a communications interface 50. Communications interface 50 might be used to allow software and data to be transferred between computing component 32 and external devices. Examples of communications interface 50 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 50 might typically be carried on signals, which can be electronic, electromagnetic (which includes optical) or other signals capable of being exchanged by a given communications interface 50. These signals might be provided to communications interface 50 via a channel 52. This channel 52 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 38, storage unit 48, media 44, and channel 52. These and other various forms of computer program media or computer usable media may be involved in carrying one or more sequences of one or more instructions to a processing device for execution. Such instructions embodied on the medium, are generally referred to as "machine-readable code," "computer program code" or a "computer program product" (which may be grouped in the form of computer programs or other groupings). When executed, such instructions might enable the computing component 32 to perform features or functions of the disclosure as discussed herein.

Figure 3:
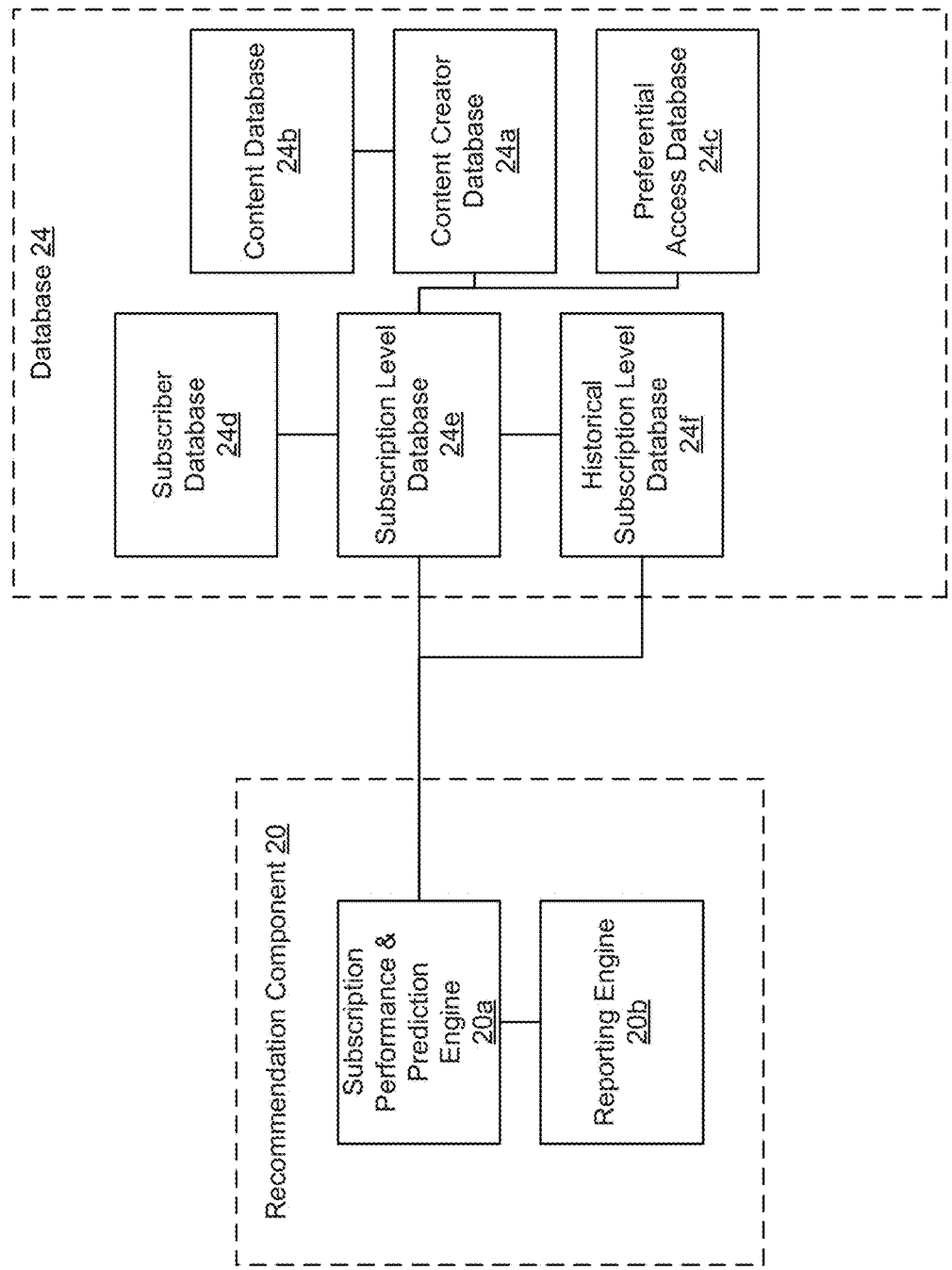
FIG. 3 illustrates an example subscription recommendation system.
Figure 4:
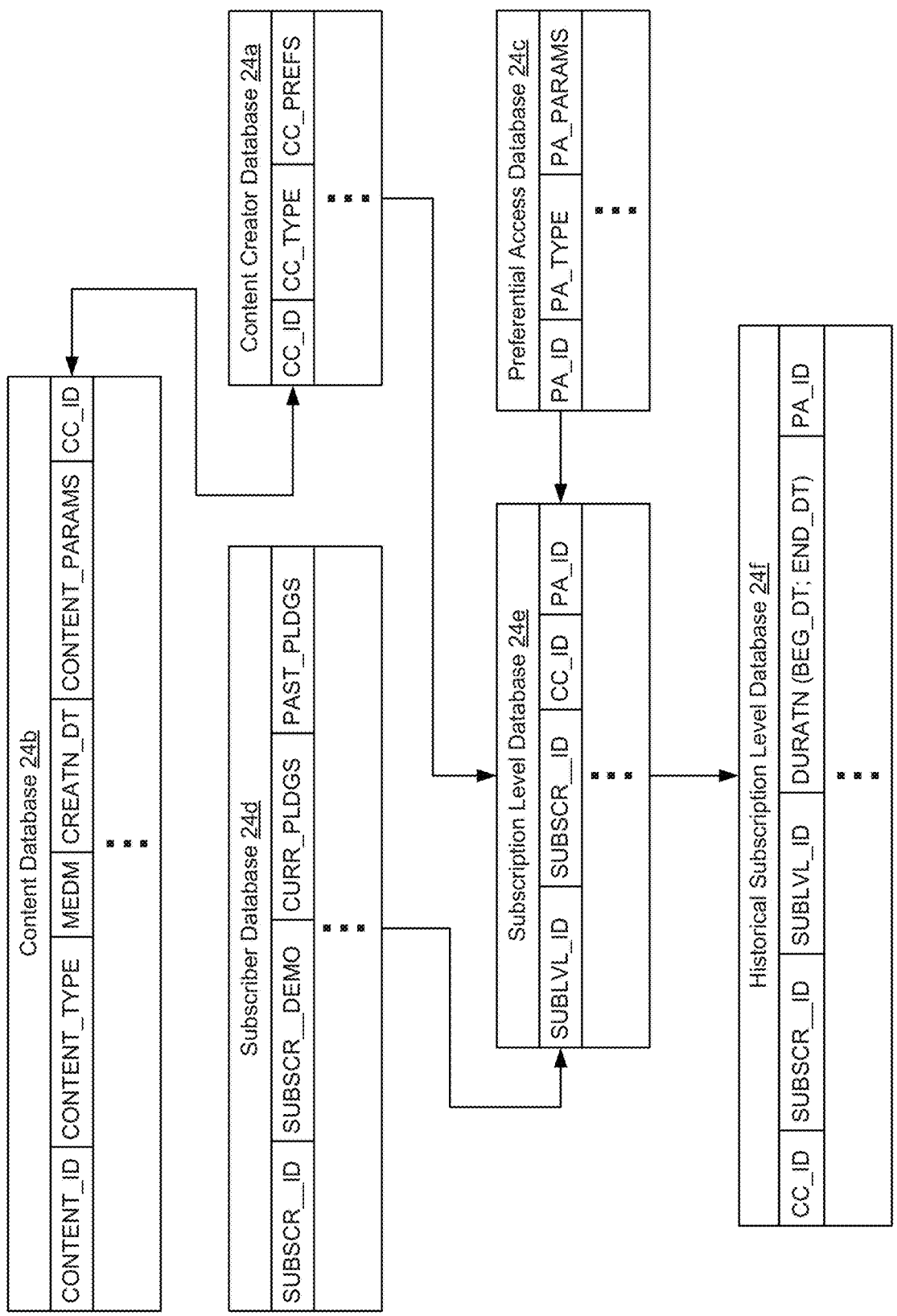
FIG. 4 is an example flow diagram illustrating example processes that may be performed for providing subscription recommendations.

FIG. 3 illustrates elements that may make up recommendation component 20 and database 24. FIG. 4 illustrates example data structures that can be used in generating subscription recommendations. FIGS. 3 and 4 are described in conjunction with each other and in the context of system 10 (see FIG. 1) for ease of explanation.

Referring to FIG. 3, Database 24 may include a content creator database 24a, a content database 24b, a preferential access database 24c, a subscriber database 24d, a subscription level database 24e, and a historical subscription level database 24f. It should be noted that the elements and/or functionality of database 24 may be implemented in local memory resident in subscription component 18 or shared between database 24 and the local memory of subscription component 18.

As indicated previously, subscription component 18 may transmit information regarding creation data, e.g., content creator data, content data, preferential access information, as well as subscription levels for storage in database 24. Database 24 may be populated with creation data and/or subscription level information monitored or obtained from and/or associated with existing content creator and/or subscriber accounts established in subscription platform 16. Creation data can refer to information that characterizes one or more of content creator 12, the content that content creator 12 creates, and activity engaged in by content creator 12 to which consumer 14 is granted preferential access.

Content creator data characterizing content creator 12 can be data reflecting the type of creator content creator 12 designates him/herself to be and/or any preferences regarding subscription offerings by content creator 12. For example, content creator type data can reflect that content creator 12 may be a paint artist, a digital artist, a sculptor, a video game developer, a writer, a performance artist, etc. Content creator preference data can reflect subscription levels content creator 12 wishes to offer to consumers and/or subscription level proportions, e.g., whether content creator 12 desires more subscribers pledging some amount of money or less subscribers pledging a greater amount of money. Content creator preference data can reflect, e.g., a desired minimum revenue or a frequency at which content creator 12 seeks to create content, etc.

Referring to FIG. 4, content creator database 24a can store content creator data in the form of records that may include, e.g., a content creator identifier ("CC_ID"), a content creator type ("CC_TYPE"), and content creator preferences ("CC_PREFS").

Returning to FIG. 3, content data characterizing the content that content creator 12 creates can refer to the type of content created, the medium in which the content is created and/or presented, the amount of content created, and/or the frequency at which the content is created. For example, type of content data and/or content medium data may indicate that content creator 12 creates paintings on canvas, video games for a mobile platform, online musical performances, etc. For example, content data amount data can reflect that content creator 12 created a series of artwork comprising four paintings. For example, content frequency data can indicate that content creator 12 developed three video games over the course of six months.

As illustrated in FIG. 4, content data can be stored in content database 24b in the form of records that may include, e.g., a content identifier ("CONTENT_ID"), a content type ("CONTENT_TYPE"), a content medium or media ("MEDM"), and content parameters which can indicate the amount of content created, and/or the frequency at which the content is created ("CONTENT_PARAMS"). The record may include information indicative of a creation date ("CREATN_DATE"). The record may be linked to content creator database 24a with the inclusion of a content creator identifier ("CC_ID") that corresponds to a content creator identifier in content creator database 24a linking content data to an appropriate content creator.

Referring back to FIG. 3, preferential access data characterizing activity in which content creator 12 engages can refer to data reflecting the type of activity, the level and/or exclusivity of preferential access to that activity granted to consumer 14, the amount of activity in which content creator 12 engages, and/or the frequency at which the activity occurs. For example, preferential access data can include data reflecting types of activity including, but are not limited to live webcasts involving content creator 12 in which consumer 14 can participate and/or view, digital copies of artwork, VIP seating at a performance, etc. For example, preferential access data can include data reflecting content creator 12's engagement in four live webcasts during the current month, and that the live webcasts occurred every Monday of the current month.

As reflected in FIG. 4, preferential access data can be stored in preferential access database 24c in the form of records that may include, e.g., a preferential access data identifier ("PA_ID"), a preferential access data type ("PA_TYPE"), and preferential access parameters indicative of, e.g., the amount of activities and/or the frequency in which content creator 12 wishes to engage ("PA_PARAMS").

As shown in FIG. 3, database 24 may include a subscriber database 24d. Subscriber data reflecting information characterizing one or more aspects of subscribers may be stored in subscriber database 24d. Consumer 14 may be a subscriber. Upon registering with subscription platform 16, consumer 14 may input certain demographic information indicative of economic and/or social characteristics of consumer 14. For example, subscriber data may reflect the yearly income of consumer 14, a geographic area in which consumer 14 resides, the age of consumer 14, interests of consumer 14, etc. Subscriber data can include data regarding the amount of money consumer 14 is currently pledged to donate to one or more content creators. Over time, subscriber data can include data regarding the amount of money consumer 14 has previously donated to one or more content creators. It should be noted that a content creator's subscribers can be collectively referred to as the content creator's community.

As shown in FIG. 4, subscriber database 24d may store subscriber data in the form of a record that may include, e.g., a subscriber identifier ("SUBSCR_ID"), subscriber demographic data ("SUBSCR_DEMO"), a subscriber's current pledges ("CURR_PLDGS"), and a subscriber's past pledged amount ("PAST_PLDGS").

Returning to FIG. 3, subscription level data can refer to data characterizing different subscription levels and corresponding preferential access information specified by content creator 12. For example, subscription level data can reflect that a ten dollar recurring donation is rewarded with a high-resolution digital image of artwork created during that month to consumer 14.

As shown in FIG. 4, subscription level database 24e may store subscription level data in a record that may include, e.g., a subscription level identifier ("SUBLVL_ID"). Subscription level database 24e can associate a particular subscription level with a particular subscriber, where the subscriber is identified with a subscriber identifier ("SUBSCR_ID"). Subscription level database 24e can link a particular content creator and a particular preferential access activity by including the appropriate content creator identifier and preferential access identifier in the record.

Periodically (e.g., every week or month) or aperiodically (e.g., upon instruction by an administrator of subscription platform 16 or upon being instructed by content creator 12), the records maintained in subscription level database 24e (which can be thought of as current data) can be transferred to historical subscription level database 24f. Historical subscription level database 24f can include duration data which indicates the amount of time that consumer 14 has been a subscriber of content creator 12 at a particular subscription level, along with corresponding preferential access information. In FIG. 4, it can be seen that this duration data ("DURATN") can be stored in historical subscription level database 24f along with the commensurate content creator identifier, subscriber identifier, subscription level identifier, and preferential access identifier. The duration data can be characterized by including data indicative of a begin date ("BEG_DT") and end date ("END_DT").

It should be noted that not all the data described above is necessarily required, and that data reflecting additional aspects of, e.g., the content, content creator, preferential access and/or subscriptions levels is contemplated by the disclosure. For example, content creator 12 need not initially specify his/her content creator preferences, and instead rely solely on recommendation component 20 to provide subscription recommendations specifying the amount and/or frequency of content creation. For example, preferential access need not necessarily be offered for each subscription level. For example, subscriber data may include data reflecting particular content creators to which a subscriber pledges donations. It should be noted that the particular format of records illustrated in FIG. 4 and described herein can vary. For example, duration data may be reflected by information indicative of the number of months consumer 14 has been a subscriber to content creator 12 rather than begin and end dates. For example, alternatives to relational databases may be used such as could be based on an object-oriented model, and hierarchical model, an entity-attribute-value data model, etc.

FIG. 3 illustrates that recommendation component 20 may comprise a subscription performance and prediction engine 20a and a reporting engine 20b for generating subscription recommendations for and reporting the subscription recommendations and performance data to one or more content creators and/or subscription platform 16. Subscription performance and prediction engine 20a may be configured to determine initial and/or current performance regarding revenue received from subscriptions and/or exposure to subscribers. Subscription performance and prediction engine 20a may obtain performance data associated with a content creator, e.g., content creator 12, from one or more of databases 24a-e. For example, subscription performance and prediction engine 20a may obtain subscription level data from subscription level database 24e, which can provide all performance data associated with a particular content creator by virtue of the linking of content creator, subscriber, and preferential access identifiers. Subscription performance and prediction engine 20a may selectively obtain one or more types of performance data from one or more of the databases 24a-e. Subscription performance and prediction engine 20a can obtain secondary performance data associated with one or more other content creators and/or subscribers. Subscription performance and prediction engine 20a can obtain historical performance data associated with a content creator or one or more other content creators.

Performance data can refer to data obtained regarding a content creator, the content creator's content, subscriber data associated with subscribers to content creator 12, and subscription level to preferential access correspondence that has been parsed and/or analyzed to determine revenue received from subscription and/or subscriber exposure. Subscription performance and prediction engine 20a can compare current performance data of a content creator (e.g., performance data from subscription level database 24e) with historical performance data of that content creator (e.g., performance data from historical subscription level database 24f) to determine whether the performance of that content creator is trending positively or negatively. Such trends can be determined from an overall performance perspective or a more granular perspective, e.g., from an individual subscriber perspective, i.e., whether or not a particular subscriber has shown a history of increasing or decreasing pledged donations, or altogether unsubscribing (which can reflected as a churn rate). For example, historical content information can be correlated to subscription level information. That is, subscription performance and prediction engine 20a may determine whether or not the creation of content impacts subscriptions. For example, it can be determined whether the creation of content results in an increase in subscriptions from never-before subscribed consumers. It can be determined whether the creation of content results in the maintenance of existing subscriptions. It can be determined whether the creation of content results in a loss of subscription (e.g., suggesting that the type, amount, and/or frequency of content creation was not enough to satisfy a consumer).

Subscription performance and predication engine 20a can compare the performance data associated with a particular content creator and compare that with secondary performance data associated with one or more other content creators. It should be noted that subscription performance and prediction engine 20a may, in comparing performance data, take into consideration whether or not there is an overlap of data between two or more content creators, e.g., an overlap in content type, subscribers, subscriber levels, etc. Such comparisons can lead to determinations regarding the effectiveness of one content creator's subscriber level and preferential access pairings relative to that of other content creators. For example, subscription performance and prediction engine 20a may compare the performance data of content creators that create the same or similar type of content to determine how the amount and/or frequency of content creation impacts are particular content creator type. For example, subscription performance and prediction engine 20a may determine that the webcomic content creators experience greater numbers of new subscribers when content is generated on a weekly basis versus a monthly basis. For example, subscription performance and prediction engine 20a may determine that performance musician content creators experience the same or similar subscribership regardless of whether those content creators provide weekly live webchats or monthly live webchats.

Subscription performance and prediction engine 20a may take into consideration time periods associated with obtained performance data, such as how subscriptions may be impacted by seasonality. Subscription performance and prediction engine 20a may take into consideration subscriber demographics and/or subscribers' other subscriptions to determine its impact on performance. For example, subscription performance and prediction engine 20a may determine that consumers that subscribe to multiple content creators of a particular type may be more apt to increase the amount of their recurring pledge donations. Subscription performance and prediction engine 20a may apply various weighting values to certain performance data to normalize that performance data. For example, subscription performance and prediction engine 20a may compare performance data of content creators that create art but in different mediums (e.g., canvas versus digital media) and give more weight to the performance data artistic content creators that create content in the same medium as that of the particular content creator whose performance is being analyzed.

Based on one or more aspects of performance data, secondary performance data, and/or historical performance data, subscription performance and prediction engine 20a may generate recommendations to increase a content creator's subscribership and/or subscriber revenue.

Subscription recommendations can refer to characterizations or re-characterizations of subscription levels and/or preferential access information correlations with subscription levels. Subscription recommendations may take a variety of forms and can involve suggestions to add, update, or remove subscription level and/or preferential access correlations currently in place for one or more content creators. Subscription recommendations can comprise donation adjustments. For example, the subscription recommendations can provide a suggestion to raise or lower the donation amount needed to gain a particular preferential access activity, a suggestion to increase or decrease the amount and/or frequency of content creation, etc. For example, subscription recommendations can suggest providing pledge donation discounts for consumers that have been subscribers for a certain amount of time Subscription recommendations can comprise subscription tier adjustments. For example, subscription recommendations may suggest adding additional levels of subscriptions to entice more consumers to subscribe that might be dissuaded by a content creator with only a few higher-priced subscription offerings. Subscription recommendations can comprise subscriber adjustments. For example, subscription recommendations may suggest that one or more subscribers be urged or prompted to "cycle up," e.g., pledge donations commensurate with a higher level subscription. Subscription recommendations may comprise partnership recommendations. For example subscription recommendations can include suggestions for a content creator to engage in one or more promotional or preferential access activities with a third party, such as a third party producing promotional merchandise.

It should be noted that only some examples of subscription recommendations are discussed herein, and are not intended to be limiting. Subscription recommendations can involve a suggested characterization or re-characterization any one of or any combination of content, content creator, preferential access, subscriber, and/or subscription level data or information. It should be noted that subscription performance and prediction engine 20a can be operative to provide subscription recommendations to a single content creator, or to a group of content creators (e.g., those having some overlapping aspects).

Subscription performance and prediction engine 20a may compute the aforementioned impacts, make the aforementioned comparisons, and/or determinations through the use of one or more statistical methods. Such statistical methods may include, but are not limited to: correlation analysis; regression analysis; clustering; decision tree analysis; and Chi-squared Automatic Interaction Detection (CHAID), a specific type of decision tree analysis; or a combination of one or more such methods.

Subscription performance and prediction engine 20a may generate subscription recommendations based upon determinations made regarding the performance of a particular content creator, and may utilize computed values indicative of the impact of various factors on performance. For example, subscription performance and prediction engine 20a may apply impact values (learned via analysis of historical performance data and its impact on subscriptions) to current performance data of a particular content creator to predict that content creator's performance. From that prediction, subscription performance and prediction engine 20a may generate subscription recommendations determined to increase revenue and/or prominence.

Subscription performance and prediction engine 20a. may forward the aforementioned subscription recommendations to reporting engine 20b to be reported to one or more content creators, and/or subscription platform 16. Reporting engine 20b may format the received subscription recommendations. For example, reporting engine 20b may format the received subscription recommendations into a more generalized format suggesting changes to the number of content a content creator should generate over the course of the next year. For example, reporting engine 20b may format the received subscription recommendations into a detailed report outlining different sets of changes to one or more of content, subscription level, and preferential access factors that may be implemented gradually throughout the next year. Reporting engine 20b may present subscription recommendations as selectable options via some user interface accessible by content creator 12 (as will be discussed in greater detail below).

Figure 5:
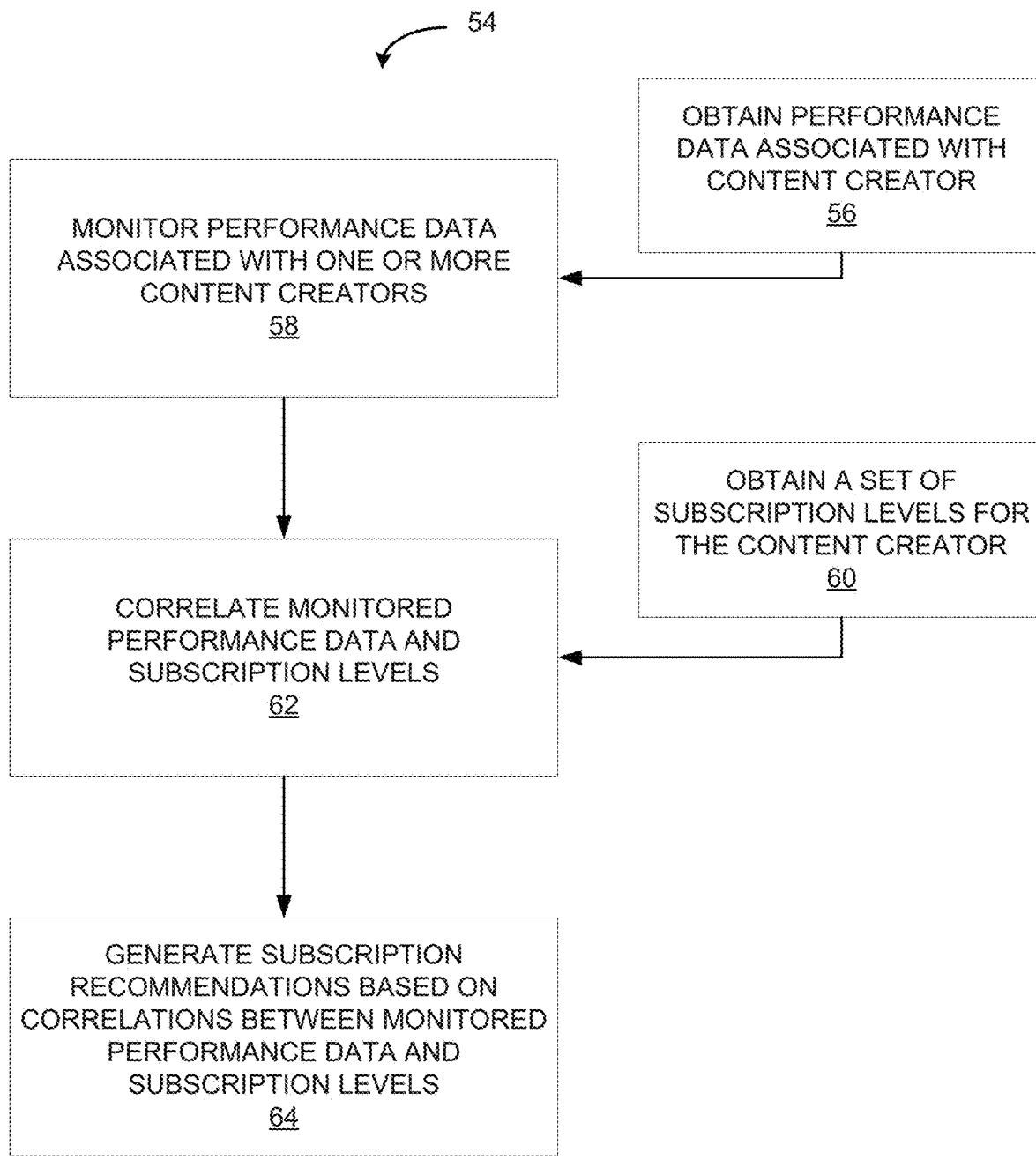
FIG. 5 illustrates example data structures utilized in providing subscription recommendations.

FIG. 5 is a flow chart illustrating operations of an example method 54 that may be performed for generating subscription recommendations. At operation 56, performance data associated with a content creator is obtained. As described previously, performance data may comprise data characterizing one or more of a content creator, content created by the content creator, content creator activity to which one or more of consumers of content generated by the content creator are granted preferential access, one or more attributes of the consumers, etc. At operation 58, the performance data associated with one or more content creators may be monitored over some period of time. At operation 60, a set of subscription levels for the content creator may be obtained. For example, subscription levels that may be applicable to the content creator can be determined from current or historical data. At operation 62, the monitored performance data and the subscription levels may be correlated. For example, subscription levels can be paired performance data indicative of, e.g., the content frequency or amount, the preferential access granted, etc. to increase revenue. At operation 64, subscription recommendations can be generated based on the correlations between the monitored performance data and the subscription levels.

Figure 6:
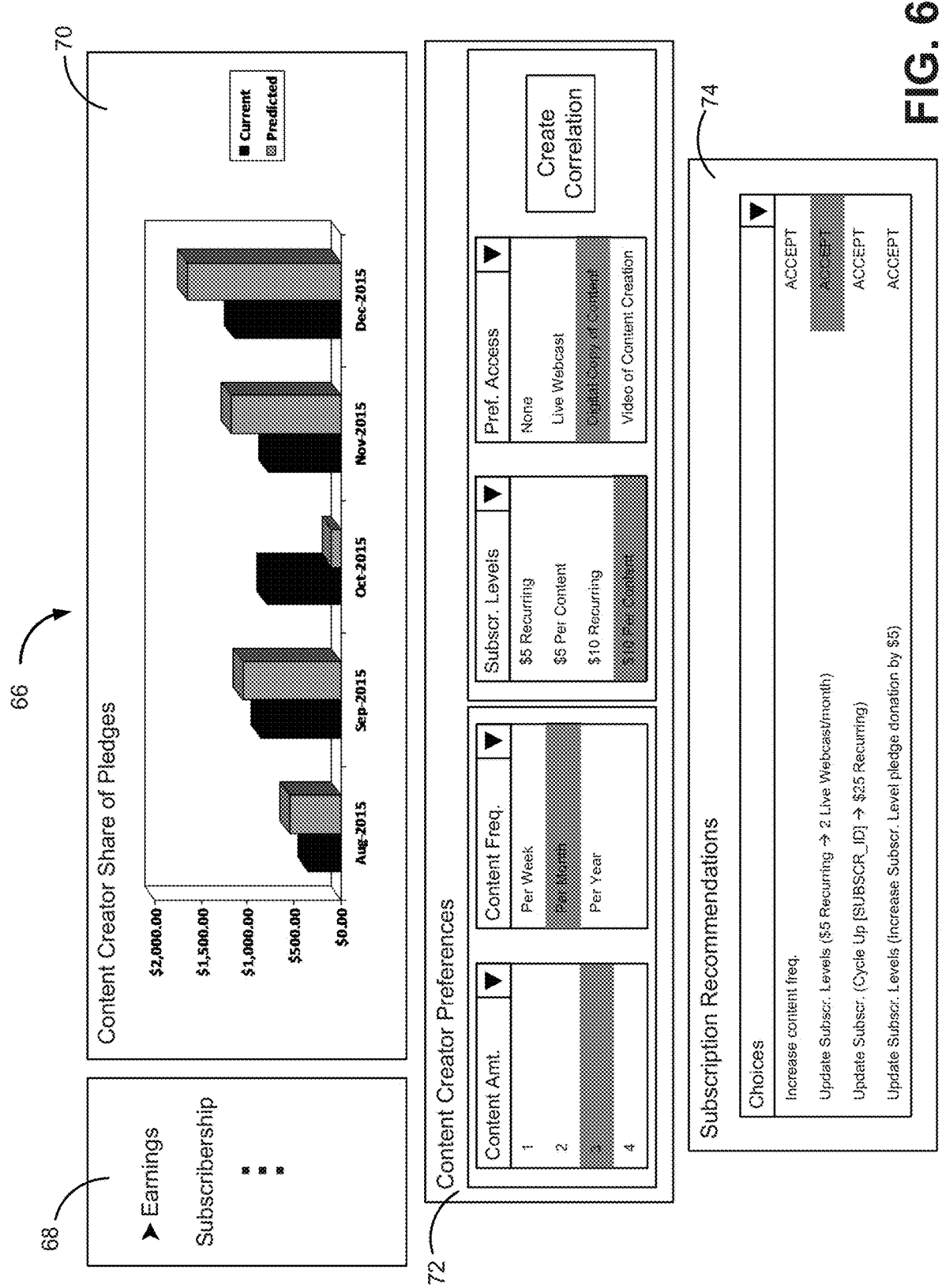
FIG. 6 illustrates an example content creator user interface through which subscriber recommendations may be presented and implemented.

FIG. 6 illustrates an example user interface 66. User interface 66 may be presented to one or more content creators, e.g., content creator 12, that have a creator account on subscription platform 16. User interface 66 may be implemented as part of a webpage "dashboard" and/or separate application accessible by content creator 12. In the context of this disclosure, a dashboard can refer to a collation of information about one or more content creators.

User interface 66 may present options content creator 12 may select to view one or more aspects of content creator 12's subscription-based business via a statistics reporting menu 68. For example, user interface 66 may present an option to view content creator 12's earnings over some period time, subscribership statistics over some period of time, etc. User interface 66 may present information regarding content creator 12's subscriber-based business, e.g., earnings, subscribership, etc. in a graphical format such as a chart 70. User interface 66 may present information in other formats or combinations of formats as well, such as in the form of a text report.

As previously discussed, content creator 12 may input one or more preferences via a preferences interface 72 associated with him/her, his/her content, subscription levels, correlated preferential access information, etc. For example, as illustrated in FIG. 6, options regarding content amount, content creation frequency, subscriber levels, preferential access activities, etc. may be presented to content creator 12. Content creator 12 may interact with preferences interface 72 via drop-down menus (or some other mechanism(s)) to view, enter, and/or select options regarding the above-noted preferences. For example, content creator 12 may select a desired subscriber level, a preferential access activity, and create a correlation between the two. Content creator 12 may enter such preferences upon creation of a creator account with subscription platform 16 and/or anytime during content creator's use of the membership platform.

As previously discussed with respect to FIG. 3, reporting engine 20b may output subscription recommendations generated by subscription performance and prediction engine 20a. One or more of these generated subscription recommendations may be presented to content creator 12 via a subscription recommendations drop-down menu 74 as selectable options. For example, each selectable option may correspond to a particular subscription recommendation. Content creator may choose to implement a subscription recommendation by selecting to accept the subscription recommendation.

It should be noted that subscription recommendations themselves may be tiered, where subscription recommendations may be generated and presented to content creator 12 in terms of predicted success levels. For example, a first set of subscription recommendations may be generated and presented to content creator 12, where this first set may be predicted to increase revenue by, e.g., 5 percent. A second set of subscription recommendations may be generated and presented to content creator 12, where this second set may include more aggressive content creation, higher level preferential access activities, etc. This second set of subscription recommendations may be predicted to increase revenue by, e.g., 20 percent. Depending, for example, on how quickly or aggressively content creator 12 wishes to increase revenue or prominence, content creator 12 may select an appropriate subscription recommendation set.

It should be noted that subscription performance and prediction engine 20a may, through one or more of the aforementioned analytic methods, or one or more other analytic methods, determine predicted results of implementing selected subscription recommendations. Predicted results can comprise purely forecasted statistics and/or comparative statistics relative to the past. Chart 70 may reflect one or both types of predicted results. For example, as illustrated in chart 70, selecting to update the five dollar recurring subscription level to correspond to two live webcasts/month can be predicted to have resulted in greater returns amount to at least $200 per month. In predicting such results, subscription performance and prediction engine 20a may consider various factors, such as seasonality. For example, chart 70 indicates that during the months of November and December, earnings per month may be even greater as historical performance data may suggest consumers tend to be more generous during the holiday season.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to analyze a subscription-based enterprise driven by a content creator creating recurring online content and generate subscription recommendations for the content creator, the system comprising:
   one or more physical processors configured by machine-readable instructions to:
      monitor a sever-hosted webpage for the online content created by the content creator;
      determine, based on the monitoring, performance data associated with the content creator, the performance data including creation data and community data, the creation data characterizing at least one of the online content made available by the content creator, the content creator, and/or content creator activity to which one or more consumers of the online content generated by the content creator are granted preferential access, and the community data characterizing one or more attributes of the consumers;
      obtain a set of subscription levels for the content creator, different subscription levels of the set corresponding to different rates of consideration payment payable by the consumers;
      analyze the performance data and the set of subscription levels to determine impact of the performance data on consumer subscriptions to the content creator at the different subscription levels; and
      generate the subscription recommendations based on the analysis of the performance data and the set of subscription levels, the subscription recommendations indicating specific creator consideration in exchange for the different subscription levels.

2. The system of claim 1, wherein the creator consideration comprises at least one of an amount of content created by the content creator and/or an amount of content creator activity commensurate with the different rates of consideration payment.

3. The system of claim 1, wherein the creator consideration comprises at least one of a frequency at which content is created by the content creator and/or a frequency of content creator activity commensurate with the different rates of consideration payment.

4. The system of claim 1, wherein the creator consideration comprises at least one of a type of content created by the content creator and/or a type of content creator activity commensurate with the different rates of consideration payment.

5. The system of claim 1, wherein the one or more physical processors is further configured by machine-readable instructions to:
   obtain secondary performance data, the secondary performance data characterizing at least one of secondary creation data and secondary community data associated with at least a second content creator, the secondary creation data characterizing at least one of secondary content created by the secondary content creator, the secondary content creator, and/or secondary content creator activity to which one or more of consumers of the secondary content are granted preferential access, and the secondary community data characterizing one or more attributes of the consumers of the secondary content; and
   generate the subscription recommendations further based on the secondary performance data.

6. The system of claim 1, wherein the one or more physical processors is further configured by machine-readable instructions to:
obtain a set of preferred subscription levels specified by the content creator; and
customize the subscription recommendations based on the set of preferred subscription levels.

7. The system of claim 1, wherein the one or more physical processors is further configured by machine-readable instructions to:
obtain at least one of content and/or content creator activity preferences specified by the content creator; and
customize the subscription recommendations based on the at least one of content and/or content creator activity preferences.

8. The system of claim 7, wherein the at least one of online content and/or content creator activity preferences comprises one or more of preferred amounts of the online content to be created and/or content creator activity to be engaged in, preferred frequencies at which content is to be created and/or content creator activity to be engaged in, and/or preferred types of content to be created and/or content creator activity to be engaged in specified by the content creator.

9. The system of claim 1, wherein the subscription recommendations comprise a recommendation for adjusting a current subscription level of at least one consumer to a new subscription level based upon the analysis of the performance data and the set of subscription levels.

10. The system of claim 9, wherein the analysis of the performance data and the set of subscription levels comprises determining a trend in the performance data including at least one of a churn rate or a cycling trend associated with the consumers of the online content.

11. A method of generating subscription recommendations, the method being implemented in a computer system comprising one or more physical processors and non-transitory electronic storage media storing machine-readable instructions, the method comprising:
monitoring a sever-hosted recurring content creation webpage for online content created by a content creator creating recurring online content;
determining obtaining, based on the monitoring, performance data associated with the content creator, the performance data including creation data and community data, the creation data characterizing at least one of the online content made available by the content creator, the content creator, and/or content creator activity to which one or more consumers of the online content generated by the content creator are granted preferential access, and the community data characterizing one or more attributes of the consumers;
obtaining a set of subscription levels for the content creator, different subscription levels of the set corresponding to different rates of consideration payment payable by the consumers;
analyzing the performance data and the set of subscription levels to determine impact of the performance data on consumer subscriptions to the content creator at the different subscription levels; and
generating the subscription recommendations based on the analysis of the performance data and subscription levels, the subscription recommendations including specific creator consideration in exchange for the different subscription levels.

12. The method of claim 11, wherein the specific creator consideration comprises at least one of an amount of content created by the content creator and/or an amount of content creator activity commensurate with the different rates of consideration payment.

13. The method of claim 11, wherein the specific creator consideration comprises at least one of a frequency at which content is created by the content creator and/or a frequency of content creator activity commensurate with the different rates of consideration payment.

14. The method of claim 11, wherein the specific creator consideration comprises at least one of a type of content created by the content creator and/or a type of content creator activity commensurate with the different rates of consideration payment.

15. The method of claim 11, further comprising obtaining one or more of preferred subscription levels, preferred content to be created, and/or preferred content creator activity to be undertaken.

16. The method of claim 15, wherein the generation of the subscription recommendations is further based upon the one or more of the preferred subscription levels, the preferred content to be created, and/or the preferred content creator activity to be undertaken.

17. The method of claim 11, wherein the subscription recommendations comprise a recommendation for adjusting a current subscription level of at least one consumer to a new subscription level based upon an observed trend in the performance data determined through the analysis of the performance data and the set of subscription levels.

18. The method of claim 17, wherein the observed trend in the performance data comprises at least one of a churn rate and a cycling trend associated with the consumers of the online content.

19. The method of claim 11, wherein the subscription recommendations comprise a recommendation for engaging in a partnership with a third-party undertaking a promotional activity on behalf of the content creator.

20. The method of claim 11, wherein the subscription recommendations comprise different sets of subscription recommendations, each of the different sets of subscription recommendations being commensurate with a different level of predicted impact on the performance data.

* * * * *

UNITED STATES PATENT AND TRADEMARK OFFICE
CERTIFICATE OF CORRECTION

PATENT NO. : 10,607,242 B1
APPLICATION NO. : 15/432828
DATED : February 14, 2017
INVENTOR(S) : Timothy Wood Page 1 of 1

It is certified that error appears in the above-identified patent and that said Letters Patent is hereby corrected as shown below:

In Claim 11, Column 17, Line 44, delete "obtaining".

Signed and Sealed this
Twenty-eighth Day of July, 2020

Andrei Iancu
*Director of the United States Patent and Trademark Office*